United States Patent [19]

Komp

[11] 3,789,216

[45] Jan. 29, 1974

[54] PHOTODETECTION DEVICE AND METHOD COMPRISING PHTHALOCYANINE

[75] Inventor: Richard J. Komp, Bowling Green, Ky.

[73] Assignee: Xerox Corporation, Stamford, Conn.

[22] Filed: Jan. 2, 1973

[21] Appl. No.: 320,421

[52] U.S. Cl. ........... 250/211 R, 260/314.5, 356/218
[51] Int. Cl. ........... G01j 1/42
[58] Field of Search 260/314.5; 250/211 R; 356/218

[56] References Cited

UNITED STATES PATENTS

| | | | |
|---|---|---|---|
| 2,069,505 | 2/1937 | Roberts | 250/211 R |
| 3,672,979 | 6/1972 | Gerace et al. | 260/314.5 |

*Primary Examiner*—James W. Lawrence
*Assistant Examiner*—T. N. Grigsby
*Attorney, Agent, or Firm*—James J. Ralabate et al.

[57] ABSTRACT

Photoelectric device comprising a pair of electrodes, at least one of which is transparent, and sandwiched therebetween an interlayer containing a phthalocyanine pigment dispersed in an organic film forming polymeric binder. During operation of this device a biasing potential is applied across these electrodes and the interlayer irradiated through the transparent electrode which serves as a window for this photoelectric device. Because of the very high photosensitivity and rapid response times of this inter-layer, this device is suitable for use in detection of relatively low intensity incident or reflected light of short impulse duration. This sensitivity and spectral response to light in the red band of the visible spectrum makes such a device ideally suited for use in conjunction with red laser scanners.

13 Claims, 8 Drawing Figures

PHOTODETECTION DEVICE AND METHOD COMPRISING PHTHALOCYANINE

BACKGROUND OF THE INVENTION

Field of the Invention

This invention relates to photoelectric devices. More specifically, this invention embraces photoelectric devices wherein the light sensitive medium comprises a phthalocyanine pigment dispersed in a film forming polymeric binder. Such devices are especially suitable for detection and monitoring of relatively low intensity incident and reflective light of short impulse duration in the red and near infrared portions of the spectrum.

Description of the Prior Art

It is well known that the electrical properties of certain materials are affected by the action of light. This phenomenon is referred to as a photoelectric effect and ordinarily is manifested in one of two ways — either as a change in the electrical resistance of the irradiated substance or as a flow of electrons which takes place in or from a substance when such material is exposed to radiant energy, such as light. Photoelectric cells are generally classified as photoresistive where electrical resistance changes in response to light or as photovoltaic where an electromotive force is generated in the photosensitive substance in response to such radiation.

Photoelectric cells of the photovoltaic and photoconductive variety commonly have a laminar type of construction consisting of contiguous layers of certain light sensitive materials, such as cuprous oxide or selenium sandwiched between suitable electrodes, at least one of which is transparent.

Solar cells are similarly constructed. However, photosensitive materials commonly used therein (e.g. cadmium sulfide; cadmium selenide; gallium arsenide; etc.) do not possess the requisite sensitivity or spectral response to be suitable for use in the monitoring of high intensity pulsating emissions of the type produced by red lasers. It is noteworthy that none of the materials traditionally used in such devices have until recently employed organic photoconductive materials. While such materials are disclosed in the patent literature, such photoconductive layers generally comprise discontinuous films of aromatic dyes coated on a conductive substrate, U. S. Pat. Nos. 3,057,947; 3,009,006; and 3,009,981. The materials disclosed in the above patents are generally of a low sensitivity and have photoresponse times too slow for detection and monitoring of high frequency pulsating emissions of red lasers. Moreover, since these photoconductive materials are crystalline they do not form films having good mechanical strength and can only be prepared for such devices by complex fabrication techniques. More recently, photoelectric devices have been disclosed wherein the photoconductive element comprises certain selected dyes dispersed in a resinous binder, U. S. Pat. No. 3,634,424. This device does not appear to have the rapid response or spectral sensitivity required for use in conjunction with detection of red laser emissions.

It is, therefore, an object of this invention to provide a photoelectric cell devoid of the above-noted deficiencies in the prior art.

It is a further object of this invention to provide a photoelectric cell utilizing organic photoconductive materials having high photosensitivity.

It is a still further object of this invention to provide photoelectric cells wherein the photoconductive layer can be readily fabricated by simple and inexpensive techniques. A still further object of this invention is to provide a photoelectric cell having the spectral sensitivity and rapid response time necessary for detecting and monitoring both incident and reflected light from red lasers.

SUMMARY OF THE INVENTION

The above and related objects of this invention are accomplished by providing a photoelectric cell capable of detecting and monitoring incident and relfected emissions from red lasers, said cell comprising a three layer structure wherein a photoconductive layer comprising a dispersion of a phthalocyanine pigment in an organic film forming polymeric binder is laminated between two conductive plates, at least one of which is transparent, said plates being electrically connected to an energized power source in such a manner as to provide a biasing potential across the photoconductive layer and as to further provide for the maintenance of a positive potential on the transparent plate through which illumination of the photoconductive layer is affected.

Upon detection of light impulses within the range of its spectral sensitivity or upon detection of changes in intensity of light within said range, the photoconductive layer of the photocell will be rendered selectively more conductive and able to transport charge carriers from one electrode to the other.

In the preferred embodiment of this invention the weight ratio of phthalocyanine to binder in the photoconductive layer can range from about 1:6 to 1:1; and the transparent "window" through which the photoconductive layer is illuminated is an electrically conductive transparent glass plate or metallized plastic film.

DESCRIPTION OF THE INVENTION INCLUDING PREFERRED EMBODIMENTS

Figure 1:
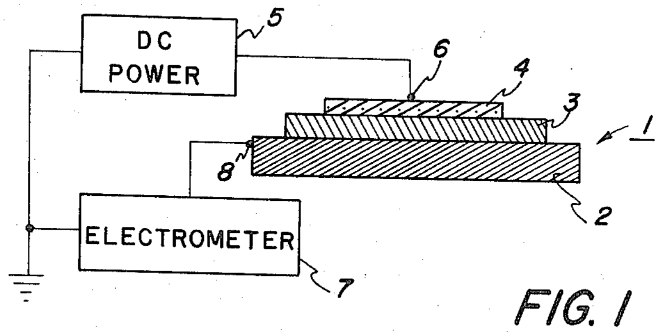
FIG. 1 is an elevational view in vertical cross-section of a photoelectric device of this invention.

These photocells can be readily prepared by coating an electrically conductive plate, generally the transparent plate (also hereinafter referred to as electrodes), with a thin film of an organic photoconductive composition and then overlaying this organic layer with a second electrically conductive plate. These plates are then electrically connected to an appropriate power supply and potential monitoring station.

As indicated previously, at least one of these plates need be transparent in order to provide a window for illumination of the organic photoconductive interlayer. Generally, any transparent conductive material can be used, provided it does not appreciably absorb light in the red portion of the visible spectrum. Typical of such materials which are available are metal oxide coated glass plates; similarly coated plastic plates; and polymeric compositions containing finely dispersed metal particles therein. The precise chemical composition of these electrodes is not believed to be critical. Their mechanical properties should be adequate to provide a firm anchor for their electrical connection to the various other elements of this photoelectrical device and to serve as substrate upon which the organic photoconductive layer can be formed.

The organic photoconductive layer of this device comprises a substantially homogenous dispersion of a phthalocyanine pigment in a film forming polymeric binder. The relative concentration of this pigment in the binder should be sufficient to provide near interparticulate contact in order to insure rapid transport of carriers from one electrode to the other. Ordinarily, such concentration of pigment to binder is adjusted whereby the binder gap between adjacent pigment particles is in the range of from about 10 to 100 A thus enabling the desired rapid response time and high photosensitivity. The minimum concentration of pigment necessary to achieve this result is about one part by weight pigment to about 30 parts by weight binder. The maintenance of the mechanical integrity of this film limits the upper concentration of pigment in the binder to about 3 parts pigment to about 1 part binder. Generally, a weight ratio of pigment to binder in the range of from about 1:1 to about 1:6 is preferred; this range of concentration providing a good balance between the mechanical integrity of the film and the speed of carrier transport within this photoconductive layer.

The phthalocyanine pigments which can be used in the interlayer of the photoelectric device of this invention are well known and fully described in the technical literature; Moser and Thomas, Phthalocyanine Compounds, ACS Monograph Series, Reinhold Publishing Corporation, New York (1963). The preferred pigments of this photoconductive layer have high red sensitivity and response times of less than one microsecond. Within the class of preferred pigments are the $\alpha$ and $\beta$ forms of metal free phthalocyanine pigments; the X-form of both metal containing and metal free phthalocyanine pigments (the preparation of which is taught in U. S. Re27,117); and mixtures thereof.

The film forming polymeric binder used in dispersion of the pigment in this photoconductive layer can be any one or combination of resins which are both compatible with the chemical and electrical properties of the pigment and compatible with one another. Representative resins which are suitable for the above purpose include vinyl and vinylidene polymers such as polystyrene, polymethylstyrene, polymethylmethacrylate, polyacrylic acid, polyacrylonitrile, polyvinyl acetate, polyvinylidene chloride, and polyvinylcarbazole, polyvinyl ethers; polyvinyl ketones; polyamides such as polycaprolactam and polyhexamethylene adipamide; polyesters such as polyethylene terephthalate; polycarbonates; cellulosic polymers such as cellulose acetate; phenolic resins such as phenol formaldehyde resins; amino resins; hydroxy resins; phenoxy resins; silicone resins; alkyd resins; and mixtures thereof.

Because of the maintenance of a biasing potential on the plates sandwiching this photoconductive film, this film need be of a sufficient thickness and insulative character to prevent the permature injection of carriers. The requisite thickness of this photoconductive layer will thus vary with the concentration of pigment and magnitude of the biasing potential. Taking into consideration the performance specifications set forth above and hereinafter for this photoelectric device, this photoconductive interlayer should have a thickness of about 0.2 to about 200 microns; with thicknesses in the range of about 5 to about 30 microns being preferred.

In preparation of the sensor element of the photoelectric device of this invention, the plates are thoroughly cleaned, and then a photoconductive overcoating of the appropriate thickness applied to either. This photoconductive film must be allowed to adequately cure, especially if formed by solvent casting techniques, in order to allow for the substantially complete evaporation of solvent residues in the film and thus avoid disruption of the films carrier transport properties. The film thickness of this photoconductive layer can be readily controlled by adjustment in the viscosity of the solvent dispersion or melt and/or by a mechanical device, such as a doctor blade with an adjustable wet gap setting.

After application of this photoconductive film to one of the electrodes, a second electrode can be formed on or applied to the free surface of said photoconductive film by a variety of well known techniques; including vapor deposition or by contacting said film, if thermoplastic, with a preformed electrode and then heating said electrode. The association of the electrodes with the photoconductive interlayer must provide adequate contiguity to insure substantially complete electrical contact along the interface of the electrodes and the film.

In FIG. 1 is shown a representative embodiment of this invention as hereinbefore described. A photoelectric cell 1 comprising a transparent conductive electrode 2, a layer of photoconductive phthalocyanine binder dispersion 3 and a thin conductive deposit of metal such as aluminum 4 (also transparent) is electrically connected to power supply 5 at 6 and to electrometer 7 (potential sensing device) at 8. The electrical characteristics of the resulting circuit are such as to insure that the photoelectric device is biased to a positive potential at the transparent window electrode. Suitable bias fields for the operation of such photocells range from about 0.1 – 100 volts/micron of film thickness; with bias potentials of about 1–10 volts/micron film thickness being generally preferred.

Figure 2A:
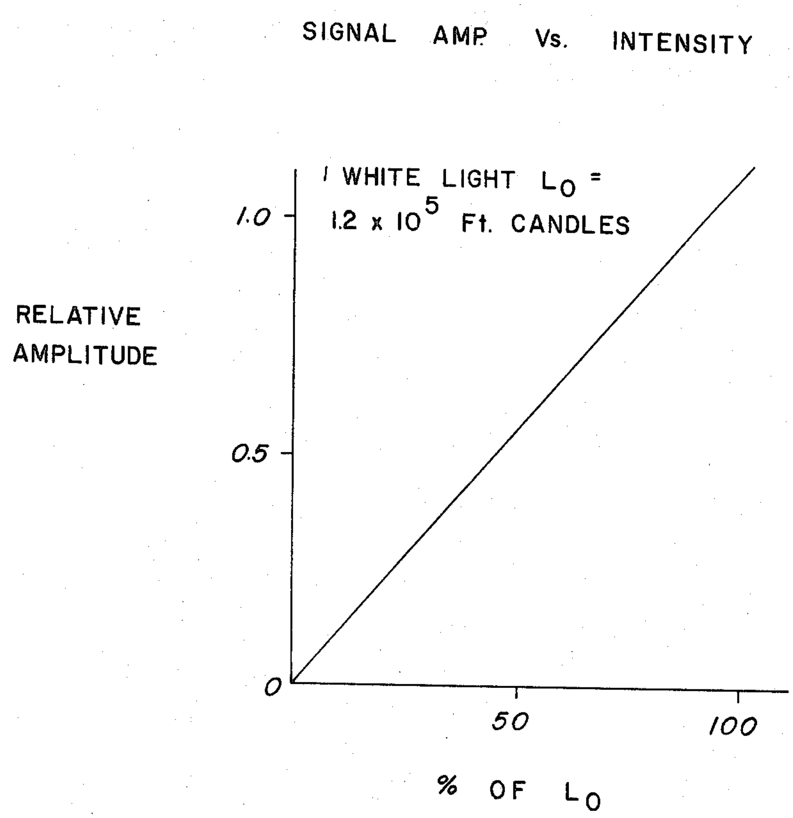
FIGS. 2a, 2b and 2c is a graphical representation of the amplitude of the electrical signal generated as plotted against the intensity of white light and monochromatic light.

When a device such as that described above is illuminated with white light, the amplitude of the signal varies directly with the intensity of the light source as graphically illustrated in FIG. 2(a). The photoresponsiveness of this device to monochromatic light is also linear, as shown graphically in FIGS. 2(*b*) and 2(*c*).

Figure 3A:
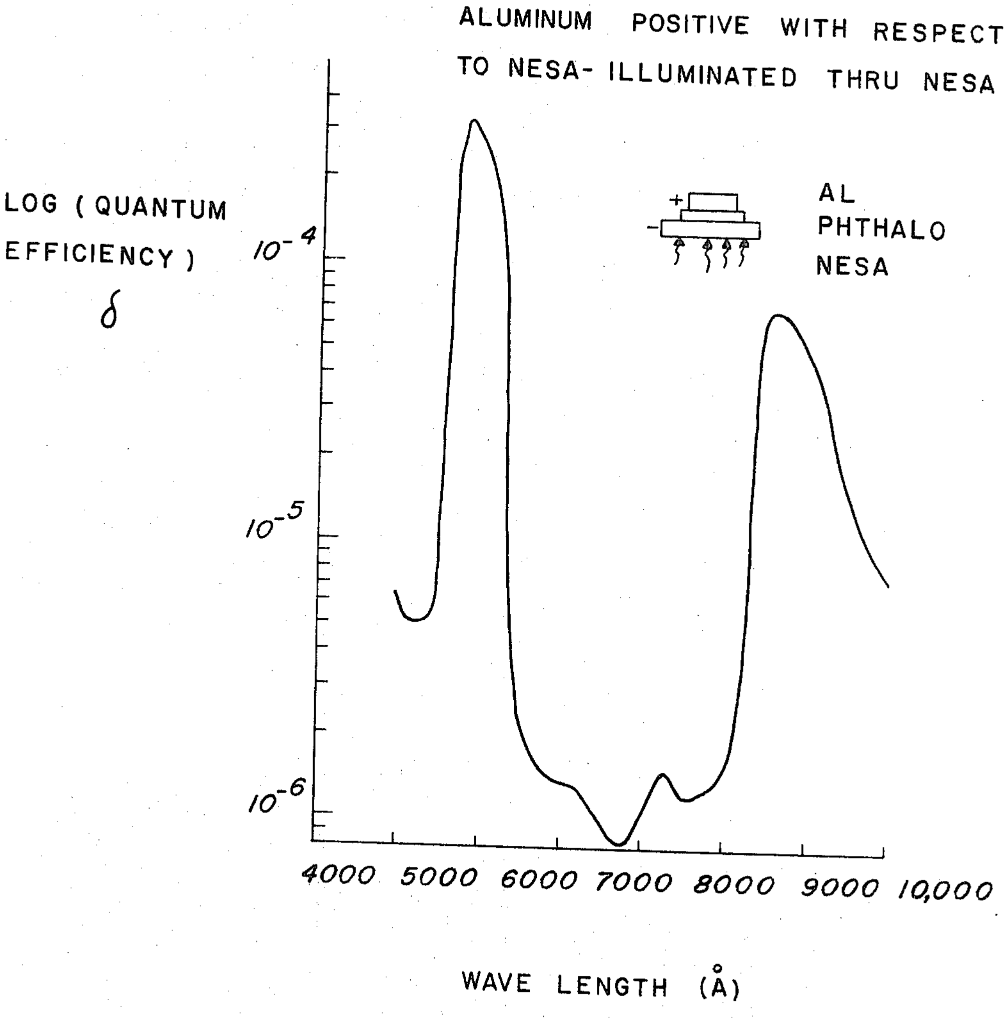
FIGS. 3a, 3b and 3c is a graphical representation of the effect that the relative polarity of the electrical bias and the direction of incoming light relative to such polarity can have on the spectral response characteristics of the photoelectric device of this invention.
Figure 3B:
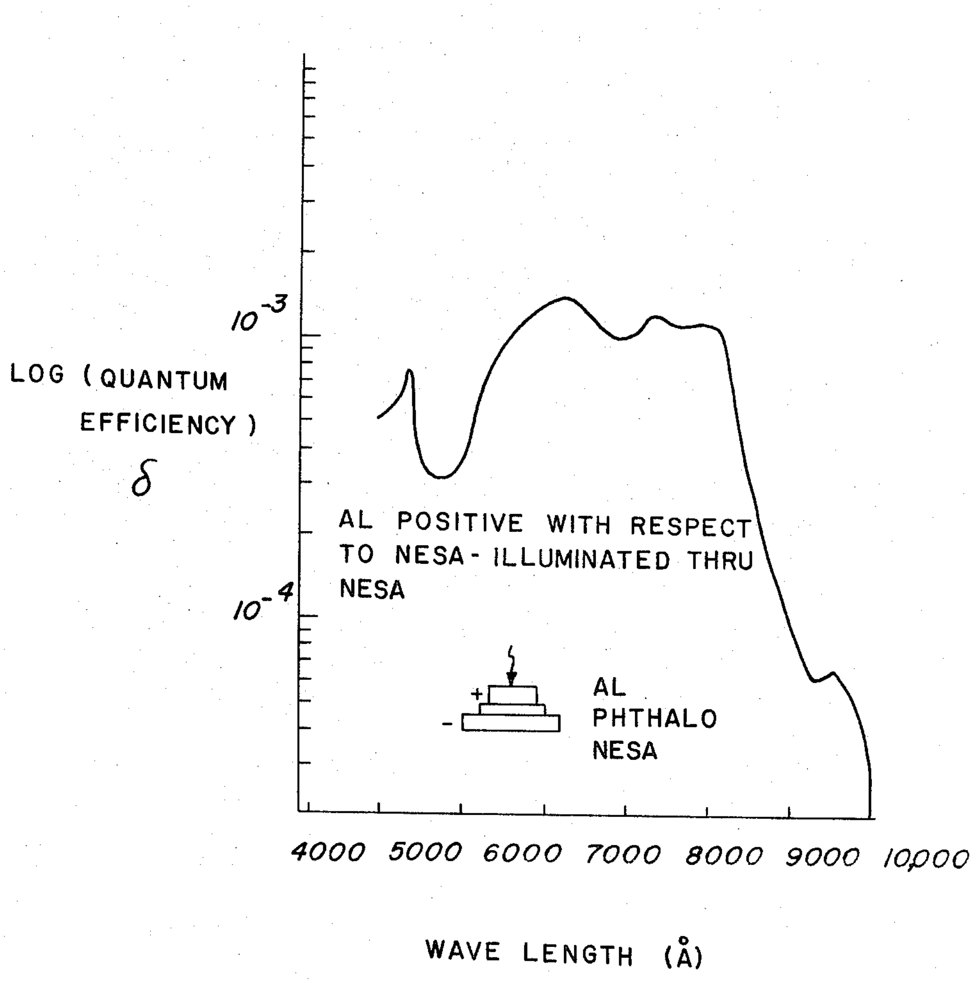
Figure 3C:
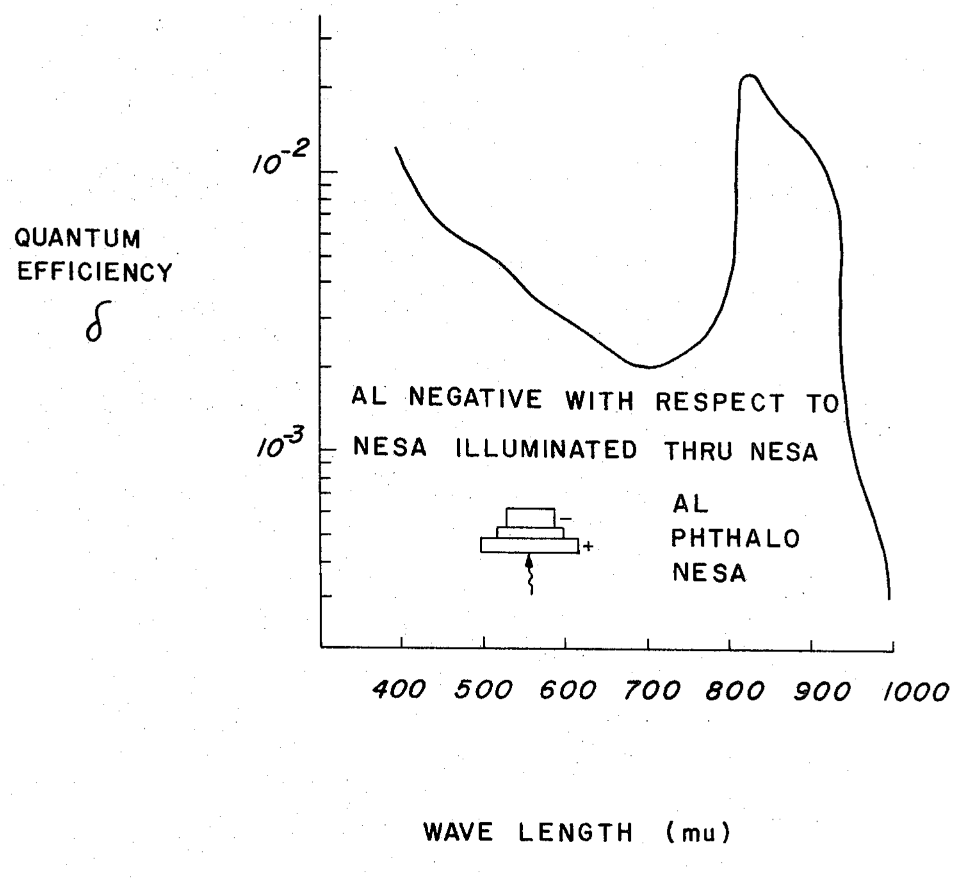

In order to determine optimal operating conditions, a series of experiments was carried out to determine the sign of the voltage bias which sould be applied to the transparent electrode of such photocells. The results, shown in FIG. 3(*a*) and 3(*b*), indicate that the illuminated transparent electrode should be positive in order to assure maximal total photoresponse and, in particular, good red and near infrared photoresponse (6,000–8500A) The reason for this is not known with certainty; however, the available evidence is consistent with the hypothesis that "holes" (i.e., positive electronic carriers) are significantly more mobile than electrons in the phthalocyanine-binder dispersions of this invention. This result was not expected on the basis of available literature; in particular, published measurements on charge transport through phthalocyanine single crystals indicate electrons (negative carriers) to be the predominant carriers, and "holes" less mobile. The phthalocyanine pigment — binder systems of the present inventions thus differ in a very essential way from binder-free phthalocyanine crystals, in which electrons are found to be more mobile than "holes." It is presently believed that the interfacial injection of carriers through the resin barriers between adjacent pigment particles is responsible for the unexpected result that positive charge carriers predominate in the materials of the present invention.

Figure 4:
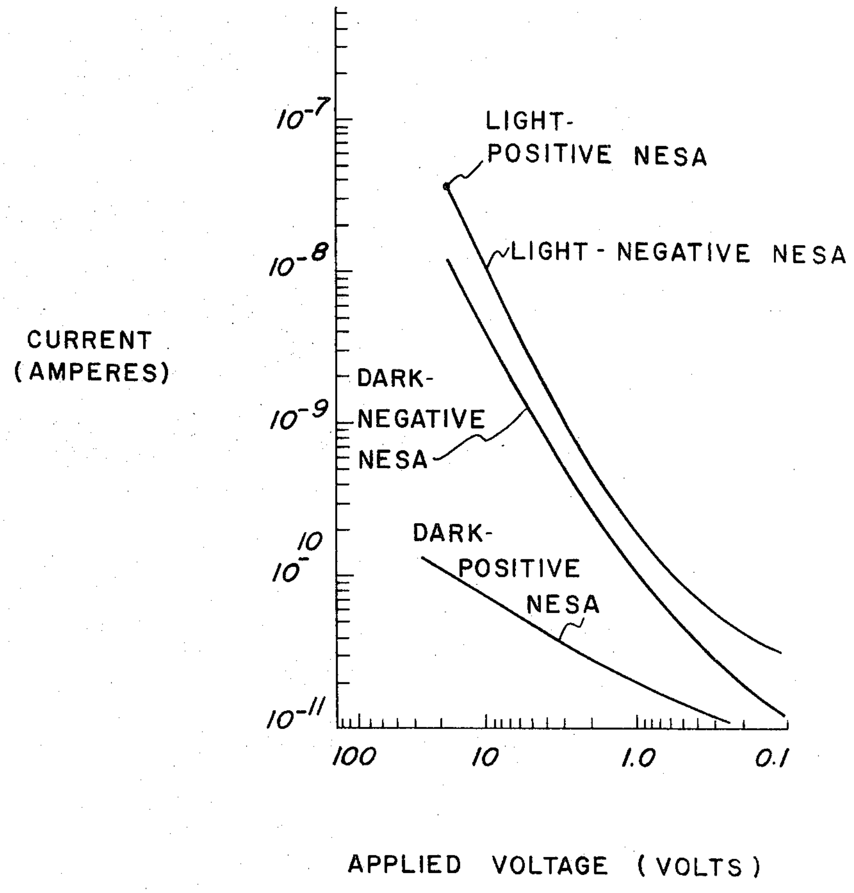
FIG. 4 is a graphical representation of the variation of current through the cell at different biasing potentials.

FIG. 4 graphically illustrates another important aspect of the behavior of this photocell: the dependence of undesirable dark current on bias polarity. For purposes of illustration, the conditions of illumination in this experiment were adjusted to produce equal photoresponse for positively and negatively biased NESA electrode. With the NESA electrode biased negative relative to the aluminum plate, the dark current was found to be up to 100 times greater than with the preferred mode (NESA biased positive relative to the aluminum counter electrode). Although the magnitude of the ratio of photocurrent to dark current varies, depending on electrode material, bias, and precise composition, it is generally found to be true that the illuminated electrode should be kept biased positively in order to suppress undesirable dark current. It is clear that the dark current of any photocell should be minimized in order to assure the greatest (photocurrent-/dark current) signal background ratio. The mechanism whereby this is controlled by selection of bias polarity is not clear; however it may be hypothesized that this is due to control of dark injection of electronic charge carriers between one of the electrodes and the pigment matrix binder. In any event, it is important to note that positive biasing of the cell results in a great enhancement of the photocurrent (as noted above in relation to FIG. 3) and a strong suppression of the dark current (FIG. 4). The coincidence of these desirable conditions is critical to the proper operation of the photoelectric device of this invention.

Because this photoelectric device is capable of very rapid and efficient response to light in the red band of the visible spectrum, it is highly suitable for the detection and monitoring of changes in intensity of emissions from red lasers. Among the better known red light sources which can be modulated or deflected in accordance with electrical signal input are helium-neon gas lasers, which operate at 6328 A ; ruby lasers, which operate at 6943 A.; and light emitting diodes ("LED's"), which may be used in a laser or non-laser mode, and which typically emit at about 9,000 A; (GaAs), 7,000 A.; (GaAlAs) or 6,600 A.; (GaAs/GaP, with 40 percent phosphide). Since all the above mentioned types of light sources may be intensity modulated at megahertz frequencies, they have become popular for use in facsimile scanning devices and in information transmission systems, such as high-frequency modulated fiber optics channels, and the like. In order to take advantage of the high-frequency modulation capabilities of such light sources, one requires photodetectors such as those disclosd in the present invention, combining the requisite rapid response time with high photosensitivity. Since the response time of the photoconductive layers of this invention is of the order of microseconds, it is thus possible to match the megahertz modulation of the light sources to the response rate of the photocells.

The examples which follow further define, describe and illustrate preparation and use of the photoconductive devices of this invention. Process conditions and apparatus not specifically set forth in preparation and evaluation of these devices are presumed to be standard or as hereinbefore described. Examples IV, V and VI have been provided to illustrate the critical parameters of the photoelectric devices of this invention and demonstrate superiority over known prior art materials. Parts and percentages appearing such examples are by weight unless otherwise specified.

EXAMPLE I

A 2 inch square NESA glass plate, (a tin oxide coated plate prepared by Pittsburg Plate Glass Co.) is washed, with a detergent and rinsed first with distilled water and then with methanol. This is followed by spray coating the tin oxide surface with a mixture comprising about 1 part by weight of "X"-form metal-free phthalocyanine (prepared as described in Example I of U. S. Re 27,117 ) and about 6 parts by weight of a resin consisting of approximately 35 parts by weight Epon-1007 (an epoxy resin manufactured by Shell Chemical Company), approximately 20 parts by weight Methylon-75201 (a phenolic resin manufactured by the General Electric Company) and approximately 4 parts by weight Uformite-F-240 (a urea-formaldehyde resin manufactured by Rohm and Haas Chemical Company). The tin oxide surface is spray coated until a wet layer (corresponding to 10 microns dry thickness) is formed upon the plate. Said plate is then dried and cured at about 140° C. for approximately 1 hours. A layer of aluminum is then vacuum evaporated upon the phthalocyanine-binder layer until said aluminum layer has approximately 30 percent transmission.

EXAMPLE II

A photocell equiped with the photoresponsive element of Example I, is prepared as follows. Electrical connections are made from the electrodes to a D.C. power supply and a cathode ray oscilloscope. The impedance of this circuit is such as to allow measurement of 1 microsecond photocurrent pulses. The aluminum layer is polarized 200 v. positive relative to the grounded NESA plate, and light is caused to impinge through the aluminum electrode. The cell is exposed to pulsed xenon light from a General Radio Strobotac, with an intensity of $160\mu w/cm^2$. The pulse response is observed to be faster than $1\mu$ sec., the limit of response being set by the duration of the light pulse and the response time of the measuring apparatus. This response speed corresponds to a bandwidth of at least 1 MHz.

EXAMPLE III

A cell of the type described in Example II is subjected to a series of 10 nanosec white light pulses from a high pressure xenon arc, projected through a Kerr cell shutter. For each pulse, the photocurrent rise peak is observed to be reached within 100 nanosec. of the opening of the shutter, and to drop to 20 percent of peak value within 200 nanosec. of the closing of the shutter. The effective bandwidth represented by this response corresponds to 5 MHz.

EXAMPLE IV

A 60$\mu$ thick photoresponsive layer, electroded and fabricated essentially as described in Example II is exposed to pulsed monochromatic radiation of a series of 25 different wavelengths, in the range of from 3500 to 10,000 A, at a constant light input of $10^9$ photons/pulse. The field is maintained at $5 \times 10^4$ v/cm, with the transparent electrode positive and the polarity of the window electrode maintained at a relatively positive potential.

Figure 2B:
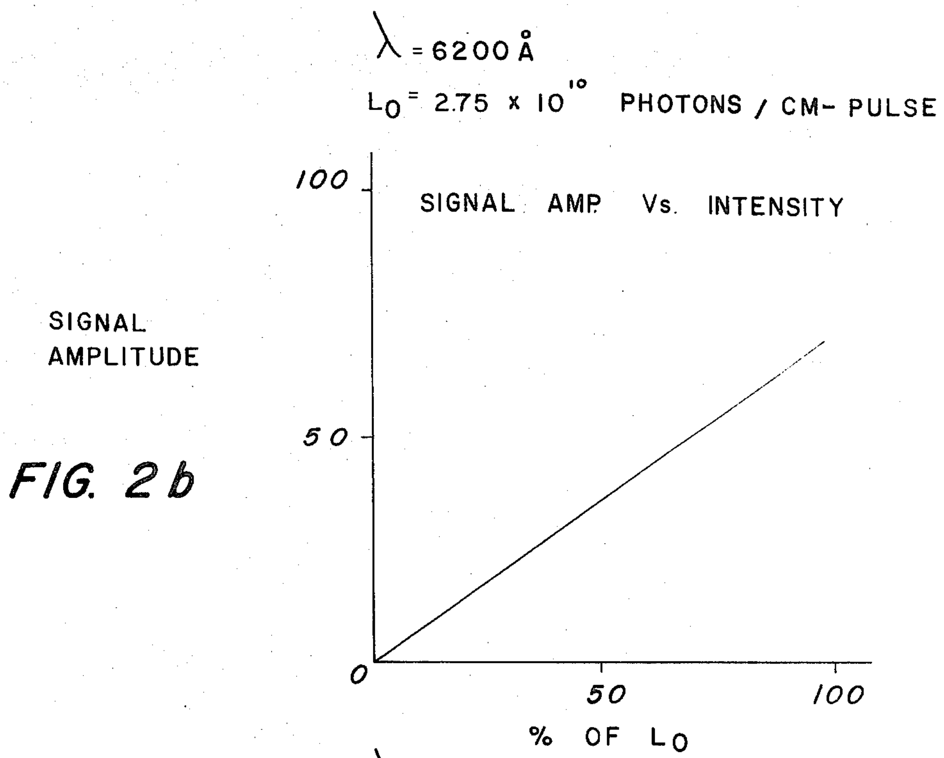
Figure 2C:
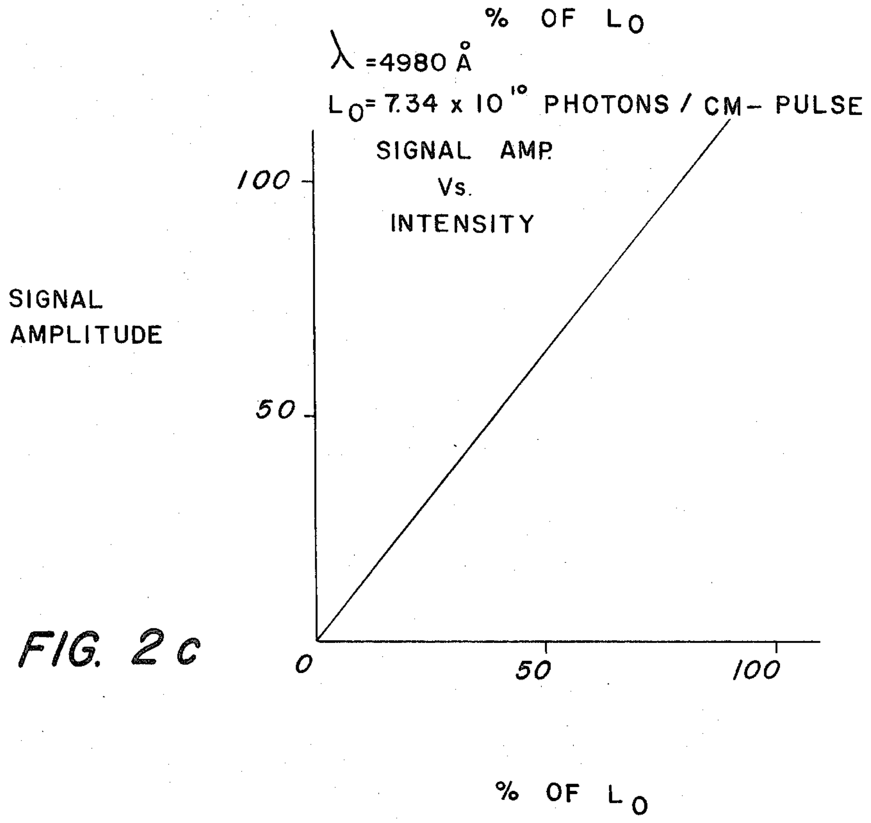

The sensitivity, in terms of electric response per incident radiation, is plotted in FIG. 2*a* for white light, and in FIGS. 2*b* and 2*c* for two wavelengths of monochromatic radiation. It is evident that this cell has very high response in the important region from 6000–8200 A.

EXAMPLE V

A photocell is constructed, in the same form as that of Example II, but with an evaporated film of aluminum which is so thin as to transmit about 60 percent of incident radiation. The photoconductive layer of this cell is 12$\mu$ thick. The cell is illuminated with microsecond radiation pulses, first through the NESA glass, then through the aluminum film, and the polarity of applied voltage is varied. The cell is illuminated with constant photon flux of $5 \times 10^{14}$ photons/cm$^2$ at each of 26 different wavelengths, and the spectral response characteristics are determined. The results are shown on matching coordinates in FIGS. 3*a* and 3*b*. Illumination through the negatively poled electrode is found to lead to poor overall response, and particularly to poor response in the 5500–8000A region. The differences between illumination through the positive and the negatively poled electrode may be interpreted by the hypothesis that photoresponse is due essentially only to the motion of positive charge carriers (holes), generated adjacent the illuminated electrode. It is seen that spectral response may be altered in major ways by controlled adjustment of cell parameters and bias polarity.

EXAMPLE VI

A photocell is constructed by the procedure of Example II using a 30$\mu$ film thickness of photoconductor-binder composition, said photocell being modified by the deposition of a 0.1 micron "blocking" layer of Formvar resin on the free surface of the phthalocyanine-binder layer prior to the vapor deposition of the aluminum layer. The cell is irradiated with white light and monochromatic ( 4980 and 6200A) light pulses of 0.2$\mu$ sec. half-peak duration. The photocurrent pulses are measured as the pulse voltage across a 1 megohm resistor. As FIGS. 2*a*, *b* and *c* show, the signal amplitude is exactly proportional to the illumination. This is a desirable characteristic, not shared by many other photoconductive cells.

The photocell is masked off, so that increments of 0.05, 0.1, 0.2, 0.5 and 1.0 in$^2$ are irradiated. The signal is found to be proportional to the area.

In Table II which follows is seen a comparison of the response rate for these pigments for signal rise and decay.

TABLE II

| Material | Response time for signal to rise— | | | | Response time for signal to decay— | | | |
|---|---|---|---|---|---|---|---|---|
| | 1 ft.=c. | 10 ft.=c. | 100 ft.=c. | $10^5$ ft.=c. | 1 ft.=c. | 10 ft.=c. | 100 ft.=c. | $10^6$ ft.=c. |
| Phthalocyanine | ---------- | <1$\mu$s | 1$\mu$s | 1$\mu$s | ---------- | ~6$\mu$s | ~6$\mu$s | ~6$\mu$s |
| Cadmium sulfide | .14s | .04s | .008s | ---------- | .05s | .02s | .005s | ---------- |
| Cadmium selenide | .02s | .004s | .001s | ---------- | .01s | .003s | .002s | ---------- |

NOTE.—s=second; Js=microsecond; (ft.=c.=foot candle.

The advantages of the novel photocell band on an organic pigment are seen to reside in its fast response coupled to relatively high photosensitivity.

EXAMPLES VII -IX

The cell of Example II is constructed in similar fashion, using beta-metal free phthalocyanine in each of the following binder resins:

Example VII — Lexan polycarbonate (General Electric Co.) — deposited from methylene chloride.

Example VIII — Luvican polyvinyl carbazole (BASF), a photoconductive binder-deposited from toluene plus cyclohexanone.

Example IX – Gelva C3V10 poly(vinylacetate-crotonic acid) — deposited from ammoniacal apueous solution.

In each case photosensitive cells are formed, having very fast response times and high sensitivity at wavelengths in the range of 6,000–7,200 A.

EXAMPLE X

A 30$\mu$ dry film of phthalocyanine binder layer, comprising 20 weight percent of beta-metal free phthalocyanine in G. E. Lexan polycarbonate resin is deposited from a methylene chloride slurry by means of a reverse-roll coater on 0.75 mil aluminum foil laminated to a 3 mil kraft paper backing. The dried photosensitive layer is covered by a 0.1 blocking layer of Formvar plastic and this, in turn, by an evaporated chromel film having an 80 percent light transmission. Flexible photocells of any desired area and shape may be fabricated from this coating by first etching a 1/6 inch rim away from the edges of the top evaporated film (to avoid shorting at the cut edges) and then attaching metal foil or wire leads to the two electrodes, e.g. by silver-epoxy cement. The photoresponse of the resultant coatings to wavelengths of 6000–7000 A is similar to that described for the previous cells; however, the beta-phthalocyanine has relatively lower response than the *x*-form in the 7500–8200 A region. Cells based on flexible electrodes, such as this one, are particularly useful for mounting in curved image planes, such as are required in certain facsimile scanners, an example of which is more specifically defined in U. S. Pat. No. 3,603,730.

EXAMPLE XI

The polycarbonate-pigment slurry described in Example X is cast onto a silicone-coated bright chrome plate and dried to form a 40$\mu$ thick self-supporting film. Two aluminum electrode strips, 0.2 mm apart and 1 cm long, are vacuum-evaporated onto the free surface through a mask. The film is stripped off to form a self-supporting photoconductive film structure. Its photoresponse is similar to that described above. Electrode shapes may be chosen to suit the geometry of the incident beam — e.g. in the shape of characters in a character recognition device.

EXAMPLE XII - XVI

The following phthalocyanines are successfully substituted for the metal-free phthalocyanine, disclosed in Example I.

Example XII — copper phthalocyanine

Example XIII — vanadyl phthalocyanine

Example XIV — heptadecachloro metal-free phthalocyanine

Example XV — naphthalocyanine

In each case, spectral response is somewhat different, but still peaked generally in the useful region between 6000–7500 A.

What is claimed is:

1. A photoelectric device comprising:

a. a photoresponsive element having a photoconductive layer sandwiched between two electrically conductive plates, at least one of said plates being substantially transparent and substantially nonabsorptive of light in the red and near infrared band of the visible spectrum;

b. an energizing power source electrically connected to the photoresponsive element so as to effect a biasing potential across said element, the relative polarity of the plates being such as to provide a positive bias on the transparent plate through which said photoconductive layer is to be illuminated; and c. an electrometer electrically connected to the photoresponsive element so as to provide for the monitoring of the flow of current through the photoconductive layer of said element, the photoconductive layer of the photoresponsive elemnt comprising a substantially homogenous particulate dispersion of phthalocyanine pigment in a film-forming organic polymeric binder, the relative weight ratio of pigment to binder being in the range of from about 3:1 to about 1:30.

2. The photoelectric device of claim 1, wherein the weight ratio of pigment to binder ranges from about 1:1 to about 1:6.

3. The photoelectric device of claim 1, wherein the binder gap between adjacent pigment particles is in the range of from about 10 to about 100 A.

4. The photoelectric device of claim 1, wherein the pigment is selected from a group consisting of metal free phthalocyanine, the X-form of metal containing phthalocyanine, the X-form of metal free phthalocyanine, and mixtures thereof.

5. The photoelectric device of claim 1, wherein the photo-conductive layer has an average thickness of from about 0.2 to about 200 microns.

6. The photoelectric device of claim 1, wherein the photoconductive layer has an average film thickness of about 5 to about 30 microns.

7. A method for monitoring changes in intensity in incident or reflected emissions from red lasers, the method comprising:

a. providing a photoelectric device having (1) a photoresponsive element comprising a photoconductive layer sandwiched between two electrically conductive plates, at least one of said plates being substantially transparent and substantially nonabsorptive of incident or reflected light in the red and near infrared band of the visible spectrum, (2) an energizing power source electrically connected to the plates of the photoresponsive element so as to effect a biasing potential across said element, the relative polarity of plate being such as to provide a positive bias on the transparent plate through which said photoconductive layer is to be illuminated, and (3) an electrometer electrically connected to the photoresponsive element so as to enable monitoring of the flow of current through the photoconductive layer of said element, and b. maintaining a bias potential on the plates of the photoresponsive element in the range of from about 0.1 to about 100 volts per micron thickness of the photoconductive layer while monitoring for red laser emissions.

the photoconductive layer of said photoresponsive element comprising a substantially homogenous particulate dispersion of phthalocyanine pigment in a film forming organic polymeric binder, the relative weight ratio of pigment to binder being in the range of about 3:1 to about 1:30.

8. The method of claim 7, wherein the bias potential on the plates of the photoresponsive element is in the range from about 1 to about 10 volts per micron thickness of the photoconductive layer.

9. The method of claim 7, wherein the weight ratio of pigment to binder ranges from about 1:1 to about 1:6.

10. The method of claim 7, wherein the binder gap between adjacent pigment particles is in the range of from about 10 to about 100 A.

11. The method of claim 7, wherein the pigment is selected from a group consisting of metal free phthalocyanine, the X-form of metal containing phthalocyanine, the X-form of metal free phthalocyanine, and mixtures thereof.

12. The method of claim 7, wherein the photoconductive layer has an average thickness of from about 0.2 to about 200 microns.

13. The method of claim 7, wherein the photoconductive layer has an average film thickness of about 5 to about 30 microns.

* * * * *

UNITED STATES PATENT OFFICE
CERTIFICATE OF CORRECTION

Patent No. 3789216 Dated January 29, 1974

Inventor(s) Richard J. Komp

It is certified that error appears in the above-identified patent and that said Letters Patent are hereby corrected as shown below:

1. Column 2, line 13--The word"relfected" should be --reflected--.
2. Column 3, line 41--"Pthalocyanine Compounds" should be underlined.
3. Column 4, line 62--The word "soulf" should be --should--.
4. Column 6, line 2--The word "disclosd" should be --disclosed--.

Signed and sealed this 5th day of November 1974.

(SEAL)
Attest:

McCOY M. GIBSON JR.
Attesting Officer

C. MARSHALL DANN
Commissioner of Patents

FORM PO-1050 (10-69) USCOMM-DC 60376-P69